(12) United States Patent
Anderson (10) Patent No.: US 6,523,098 B1
(45) Date of Patent: Feb. 18, 2003

(54) MECHANISM FOR EFFICIENT LOW PRIORITY WRITE DRAINING

(75) Inventor: Andrew V. Anderson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/469,676

(22) Filed: Dec. 22, 1999

(51) Int. Cl.[7] .............................................. G06F 12/00
(52) U.S. Cl. ........................ 711/158; 711/156; 711/163
(58) Field of Search ........................ 711/111, 112, 144, 711/150, 141, 158, 163, 167, 168, 156, 169; 710/22, 52, 113, 244, 129, 111, 107; 712/6, 21, 220; 713/600; 714/49; 365/189.07; 709/235

(56) References Cited

U.S. PATENT DOCUMENTS

| | | | | |
|---|---|---|---|---|
| 4,641,266 A | * | 2/1987 | Walsh ........................ 710/111 |
| 4,763,249 A | * | 8/1988 | Bomba et al. .............. 713/600 |
| 4,815,039 A | * | 3/1989 | Tai et al. ................ 365/189.07 |
| 4,912,632 A | * | 3/1990 | Gach et al. .................... 710/28 |
| 4,933,901 A | * | 6/1990 | Tai et al. ................ 365/189.07 |
| 5,265,212 A | * | 11/1993 | Bruce, II ..................... 710/113 |
| 5,412,788 A | * | 5/1995 | Collins et al. .............. 711/157 |
| 5,495,190 A | * | 2/1996 | Abe et al. ...................... 327/19 |
| 5,506,989 A | * | 4/1996 | Boldt et al. ................. 710/244 |
| 5,546,543 A | * | 8/1996 | Yang et al. .................. 709/235 |
| 5,659,711 A | * | 8/1997 | Sugita ......................... 711/144 |
| 5,941,967 A | * | 8/1999 | Zulian ......................... 710/107 |
| 6,076,125 A | * | 6/2000 | Anand ......................... 710/107 |
| 6,092,158 A | * | 7/2000 | Harriman et al. ........... 711/151 |
| 6,115,768 A | * | 9/2000 | Yamamoto .................. 710/107 |
| 6,154,800 A | * | 11/2000 | Anand ......................... 710/107 |
| 6,173,378 B1 | * | 1/2001 | Rozario et al. ............. 711/163 |

\* cited by examiner

*Primary Examiner*—David Hudspeth
*Assistant Examiner*—Fred F. Tzeng
(74) *Attorney, Agent, or Firm*—Blakely, Sokoloff, Taylor & Zafman LLP (57) ABSTRACT

In one embodiment, a method and apparatus for servicing a request for an opportunistic operation to a memory subsystem includes an enabling signal that is generated to service the request for the opportunistic operation according to any combination of the following information: availability of resources of the memory subsystem, status of pending requests for a high priority operation, and status of the request for the opportunistic operation.

26 Claims, 6 Drawing Sheets

MECHANISM FOR EFFICIENT LOW PRIORITY WRITE DRAINING

FIELD OF THE INVENTION

This invention relates to chipset technologies generally and particularly to efficient memory management techniques.

BACKGROUND OF THE INVENTION

As the speed of processors steadily increases, an efficient mechanism to access memory subsystems is becoming ever more significant in an overall system design.

Traditionally, a system controller is employed to exchange data between the system bus and the memory subsystem or between the various Input/Output (hereinafter I/O) devices and the memory subsystem in a system. Often times, the memory subsystem comprises Dynamic Random Access Memories (DRAMs), and the system controller usually includes one or more command queues to buffer the incoming memory commands issued by the processor(s) or I/O devices. Additionally, the system controller typically has read and write buffers to temporarily store data read from or written to the memory subsystem.

The write data buffers in the system controller reduce read response time, thereby improving system performance. For example, they can improve read response time by allowing read operations to be serviced immediately rather than waiting for all write operations to be committed to memory. Also, they can improve memory efficiency by amortizing bubbles present either on memory buses or at the core of memory due to write-read and read-write transitions.

Although the previously mentioned write buffers tend to improve the efficiency of memory, they are of finite size. As a result, their contents must be periodically drained to memory. Two approaches are commonly employed for draining write operations: 1) a high priority panic flush mechanism, which takes place when the buffers exceed a certain utilization threshold; and 2) a low priority flush mechanism, which occurs when the system goes idle. The high priority mechanism is demand driven and is a result of having write buffers with finite sizes. The low priority mechanism, on the other hand, is opportunistic. It attempts to drain write operations at opportune times to avoid interfering with read requests. It should be noted that the low priority flush may adversely impact the timing of subsequent requests for high priority activities, such as read requests, if the flush fails to complete before the high priority requests are presented to the memory subsystem.

SUMMARY OF THE INVENTION

In one embodiment, a method and apparatus for servicing a request for an opportunistic operation to a memory subsystem includes an enabling signal that is generated to service the request for the opportunistic operation according to any combination of the following information: availability of resources of the memory subsystem, status of pending requests for a high priority operation, and status of the request for the opportunistic operation.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and apparatus for servicing an opportunistic operation request to a memory subsystem is described. In the following description, numerous specific details are set forth, such as DRAM technology, queuing technology, etc. in order to provide a thorough understanding of the present invention. However, it will be apparent to one of ordinary skill in the art that the invention may be practiced without these particular details. In other instances, well-known elements and theories such DRAM technology, queuing technology, write buffer, read buffer, multithreading technology, etc. have not been discussed in special details in order to avoid obscuring the present invention.

Figure 1:
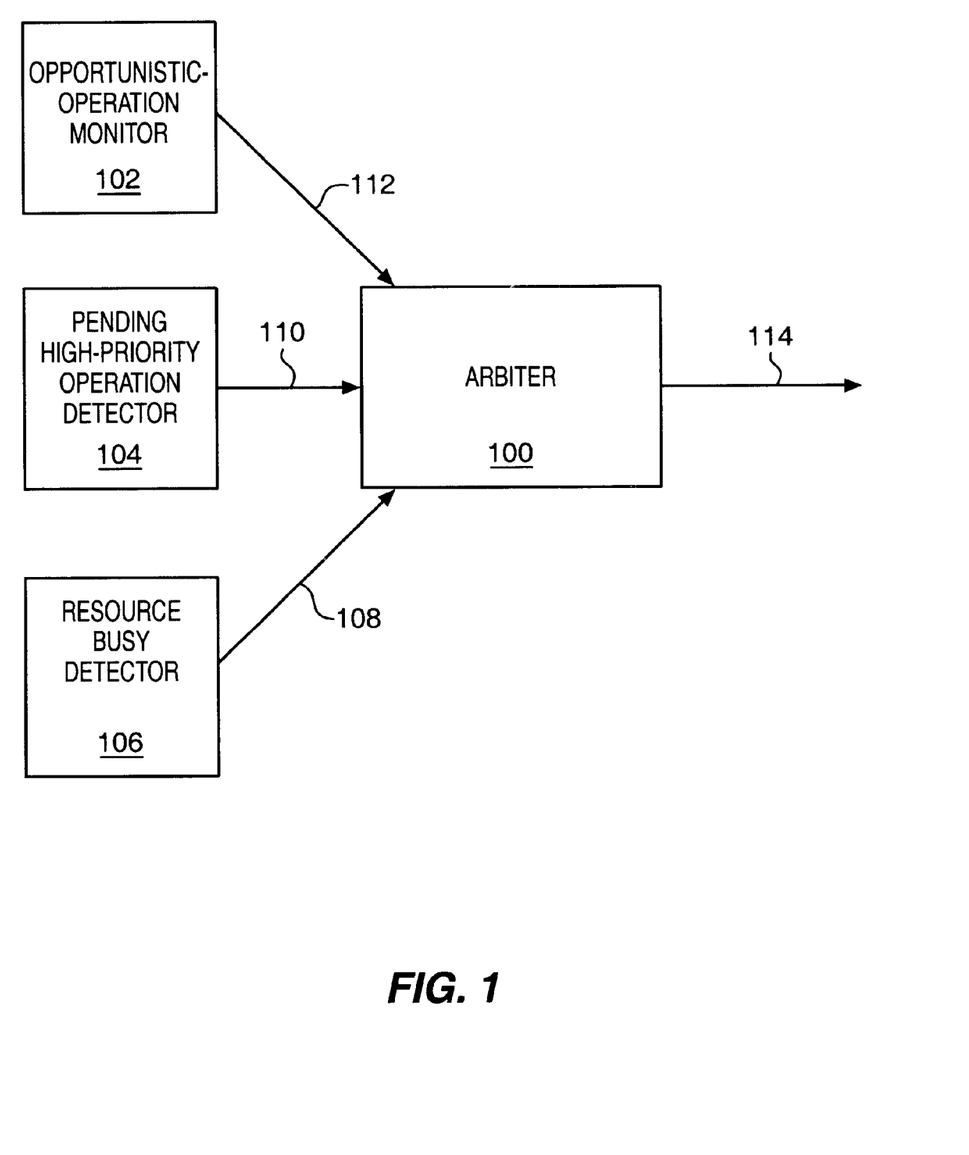
FIG. 1 illustrates a block diagram of one embodiment of an arbiter receiving information from various monitoring blocks.

Throughout the disclosure, opportunistic-operation monitor 102 pending high-priority-operation detector 104 and resource busy detector 106 are also referred as monitoring blocks 102, 104 and 106.

FIG. 1 demonstrates a block diagram of one embodiment of an arbiter receiving information from multiple monitoring blocks. The blocks are opportunistic-operation monitor 102, pending high-priority-operation detector 104 and resource busy detector 106. These monitoring blocks provide information to arbiter 100 through status signals 112, 110 and 108, respectively. When arbiter 100 receives a request for an opportunistic operation, it may generate an enabling signal 114 to service the request depending on the information conveyed by signals 108, 110 and 112. Although FIG. 1 explicitly illustrates that arbiter 100 receives information from three monitor blocks, it should have been apparent to one with ordinary skill in the art to design arbiter 100 to receive information from other sources without exceeding the scope of the present invention. For example, arbiter 100 may receive memory access requests from a graphics controller.

In one embodiment, arbiter 100 and monitoring blocks 102, 104 and 106 reside in a system controller of an electronic system. Some examples of such an electronic system are, but not limited to, standalone electronic apparatuses and general-purpose computer systems. A general-purpose computer system 200 is illustrated in FIG. 2.

The general-purpose computer system architecture comprises microprocessor 202 and cache memory 206 coupled to each other through processor bus 204. Sample computer system 200 also includes high performance system bus 208 and standard I/O bus 228. Coupled to high performance system bus 208 are microprocessor 202 and system controller 210. Additionally, system controller 210 is coupled to memory subsystem 216 through channel 214, is coupled to I/O controller hub 226 through link 224 and is coupled to graphics controller 220 through interface 222. Coupled to graphics controller is video display 218. Coupled to standard I/O bus 228 are I/O controller hub 226, mass storage 230 and alphanumeric input device or other conventional input device 232.

These elements perform their conventional functions well known in the art. Moreover, it should have been apparent to one ordinarily skilled in the art that computer system 200 could be designed with multiple microprocessors 202 and may have additional components or more components than that which is shown. In other instances, dividing functionality of a single illustrated component across various devices or integrating functionality of multiple illustrated components into a single device should also have been apparent to an ordinarily skilled artisan.

Figure 2:
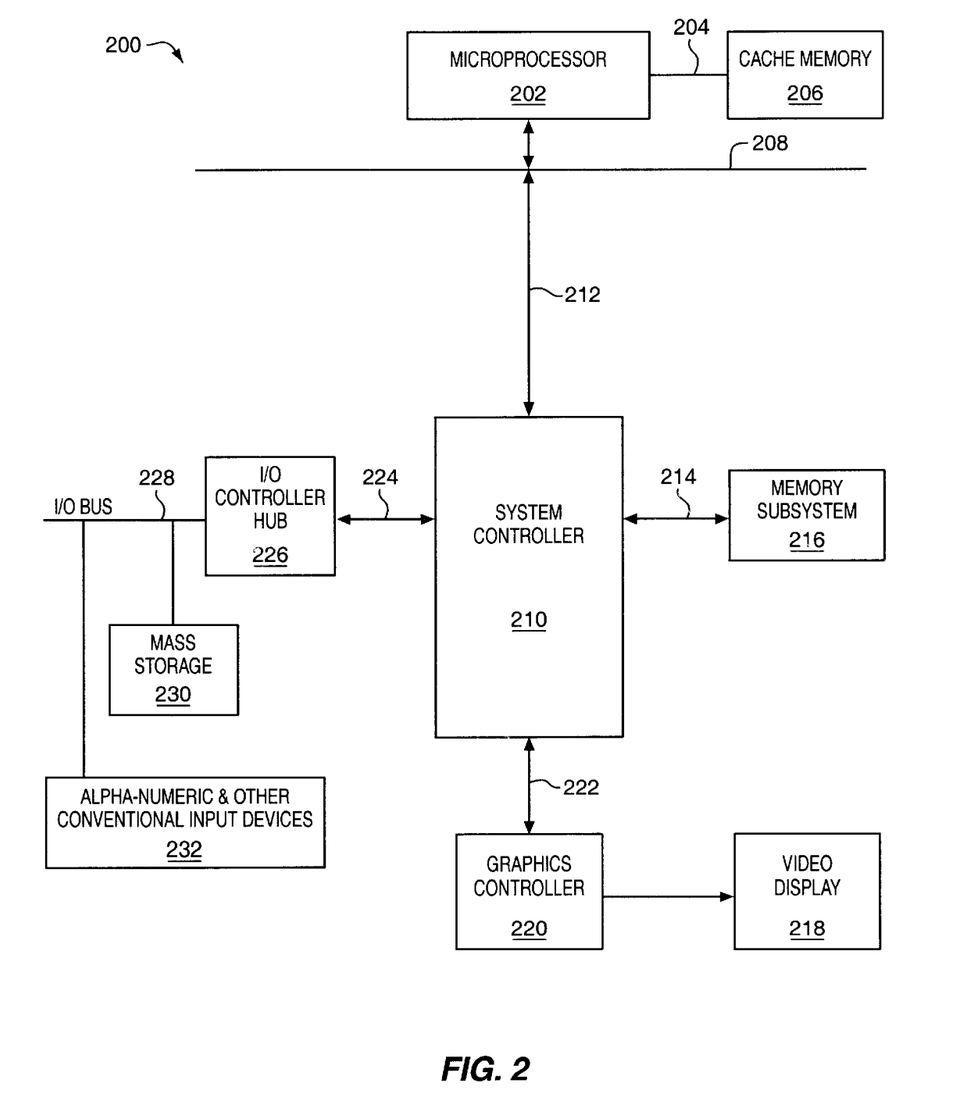
FIG. 2 illustrates one embodiment of a general-purpose computer system architecture.

Moreover, system controller 210 shown in FIG. 2 provides each critical multimedia subsystem with a direct link to the controller. The direct links, such as 224 and 222, to system controller 210 ensure mass storage 230 and graphics controller 220 deterministic access to and from memory subsystem 216. However, one ordinarily skilled in the art can implement arbiter 100 and monitoring blocks 102, 104 and 106 in another system controller architecture and yet still remain within the scope of the disclosure. For example, instead of the described direct links, the system controller may access data from multimedia subsystems through a local bus, such as Peripheral Component Interconnect (herein after PCI) bus.

Detailed Operation of One Embodiment of a System Controller

Figure 3:
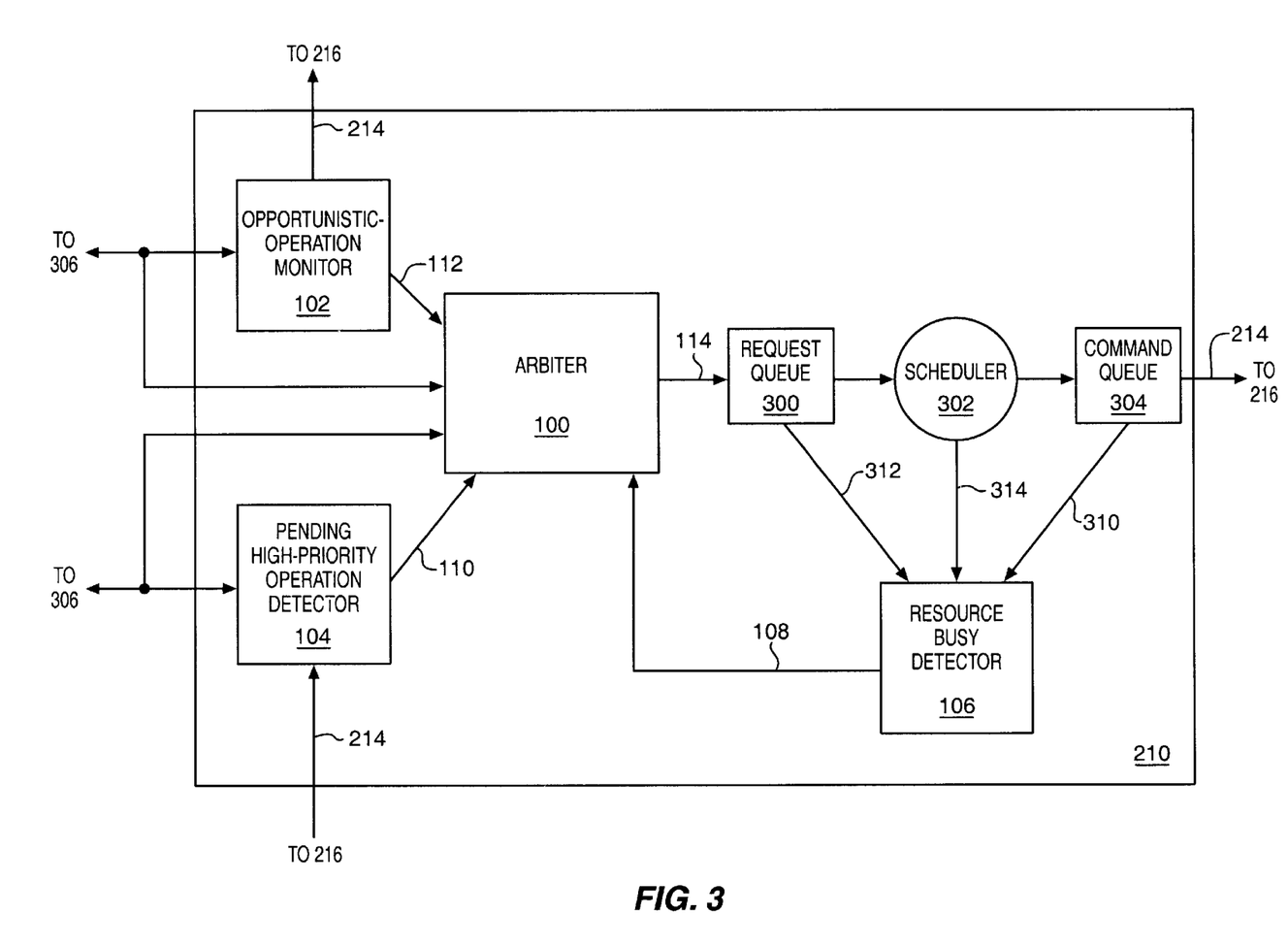
FIG. 3 illustrates one embodiment of a system controller having an arbiter and multiple monitoring blocks.

FIG. 3 illustrates one embodiment of system controller 210, which comprises the previously discussed arbiter 100 and the monitoring blocks 102, 104 and 106. In addition, system controller 210 also has request queue 300, scheduler 302 and command queue 304. Opportunistic-operation monitor 102 and pending high-priority-operation detector 104 communicate with components external to system controller 210 through link 306 and channel 214. In one embodiment, link 306 can be any or all of the following: link 212 and interface 222 as illustrated in FIG. 2.

In the subsequent paragraphs, memory subsystem 216 shown in FIG. 2 comprises DRAMs, and thus arbiter 100, request queue 300, scheduler 302 and command queue 304 all utilize appropriate protocols and techniques to ensure correct data access to and from the DRAMs. Also, the following discussions use interface 222 shown in FIG. 2 as link 306.

In one embodiment, DRAMs typically are configured like a two-dimensional matrix, where their row addresses and column addresses represent individual memory storage locations. In other configurations, DRAMs may be divided into multiple sub-memories, or memory banks. A bank address of a memory bank along with the row addresses and the column addresses within the memory bank represent memory storage locations. When system controller 210 receives memory access requests from other subsystems, such as microprocessor 202 or graphics controller 220, system controller 210 issues corresponding memory commands with appropriate row, column, or bank addresses to the DRAMs. These memory commands result in assertions of signals such a Row Address Strobe (RAS), a Column Address Strobe (CAS) and a read or write enable signal. In order to accurately read data from or write data into the DRAM, system controller 210 has to manage the timing among these signals carefully.

In one particular scenario, opportunistic-operation monitor 102 and pending high-priority-operation detector 104 generate and send status signals 112 and 110, respectively, to arbiter 100 in response to a memory read request from graphics controller 220 to system controller 210 as shown in FIG. 3. In one embodiment, when opportunistic-operation monitor 102 recognizes that its received request is a memory read request (thus not an opportunistic-operation request), monitor 102 does not assert status signal 112. On the other hand, in response to this memory read request, a high-priority-operation request, one embodiment of high-priority-operation detector 104 may assert status signal 110. Moreover, one embodiment of system controller 210 also places these memory access requests in request queue 300.

One embodiment of scheduler 302 generates and places memory commands with appropriate offsets in command queue 304 according to the memory access requests stored in request queue 300. It should be noted that scheduler 302 may implement any number of well known policies for handling the memory access requests. Some examples of these policies are, but not limited to, a First-In-First-Out (FIFO) policy or a policy which prioritizes request queue 300 based on certain attributes of the requests.

Although only a single command queue, command queue 304, and a single request queue, request queue 300, are illustrated in FIG. 3, one ordinarily skilled in the art may design system controller 210 with multiple command and request queues without exceeding the scope of this disclosure. The memory commands stored in command queue 304 then result in the previously described signals to memory subsystem 216 and allow system controller 210 to access data from memory subsystem 216 through channel 214.

However, when arbiter 100 receives a request for an opportunistic operation, such as a low priority flush request, arbiter 100 does not place the request in request queue 300, or in other words, does not generate enabling signal 114 to service the request, until certain conditions are met. In one embodiment of arbiter 100, arbiter 100 generates enabling signal 114 when two conditions are met. First, pending high-priority-operation detector 104 indicates in status signal 110 that no pending requests for high priority operations exists. Second, resource busy detector 106 indicates in status signal 108 that resources are not committed.

More specifically, one implementation of resource busy detector 106 may base its determination of resource availability based on the number of memory commands pending in command queue 304 or the number of memory access requests pending in request queue 300. Alternatively, either resource busy detector 106 or scheduler 302 may have a table with predetermined timing information associated with each memory command. Either 106 or 302 then calculates the amount of time memory subsystem 216 is committed to based on the memory commands and their corresponding timing information. In the case of scheduler 302, scheduler 302 communicates the calculated information to resource busy detector 106 through signal 314. In short, resource busy detector 106 generates status signal 108 based on the downstream information received from signal 310, signal 312 and signal 314.

The aforementioned number of memory commands pending, the number of memory access requests pending and the calculated timing information are some examples of depth value information from downstream elements. In one embodiment of system controller 210, downstream elements include request queue 300, scheduler 302, and command queue 304.

Figure 4:
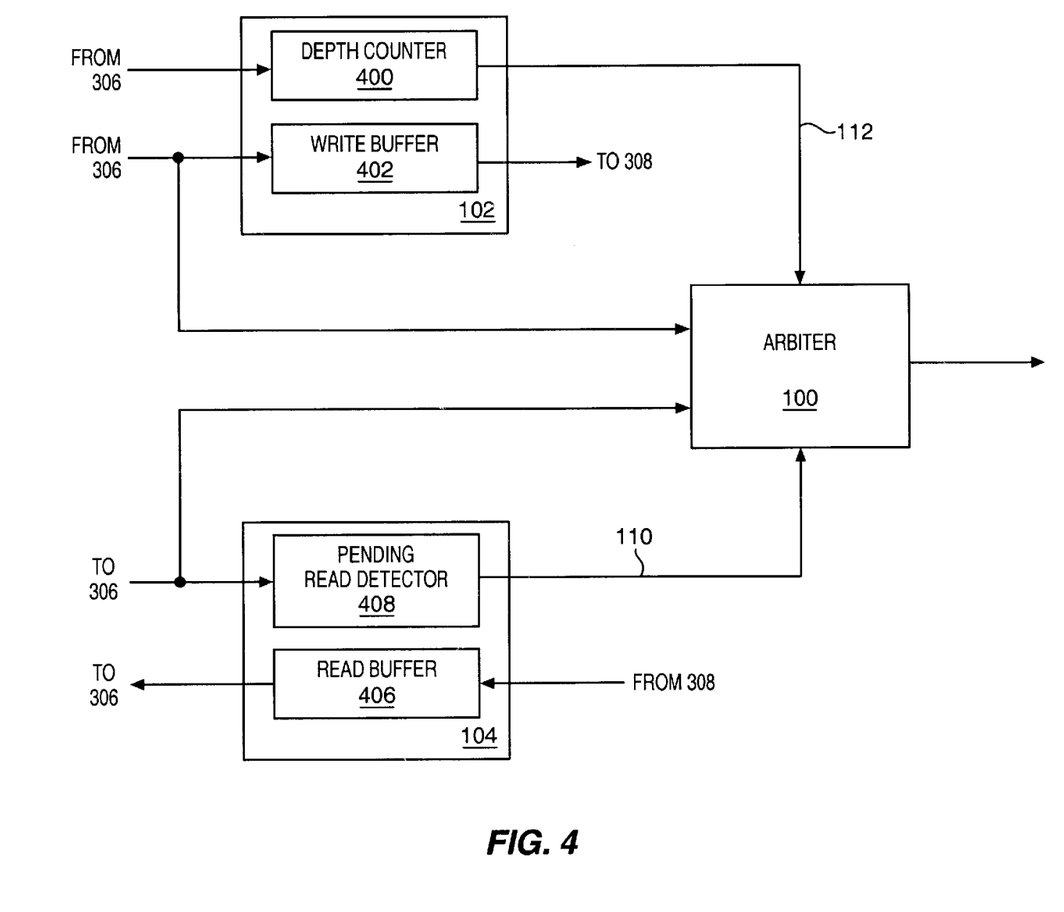
FIG. 4 illustrates particular embodiments of multiple monitoring blocks.

In another embodiment of arbiter 100, in addition to satisfying the previously discussed conditions, arbiter 100 generates enabling signal 114 when an additional condition is also fulfilled: status signal 112 indicates that the number of occurrences for low priority flush requests has exceeded a predetermined threshold value. FIG. 4 illustrates embodiments of opportunistic-operation monitor 102 and pending high-priority-operation detector 104. Monitoring block 102 comprises depth counter 400 and write buffer 402, where monitoring block 104 comprises pending read detector 404 and read buffer 406. Depth counter 400 monitors the number of occurrences for low priority flush requests and presents its outcome through status signal 112. In response to receiving a read access request, pending read detector 404 asserts status signal 110.

Although opportunistic-operation monitor 102 and pending high-priority-operation detector 104 are separate components in FIG. 3 and FIG. 4, one ordinarily skilled in the art may combine the two components into one component or even integrate the two components with arbiter 100. Also, monitoring blocks 102 and 104 may include additional functional blocks or exclude existing functional blocks. For instance, monitor block 102 may include a logic component to perform comparisons between the number of occurrences of certain requests and a predetermined threshold value. On the other hand, monitoring block 104 may exclude read buffer 406.

Even though pending read detector 404 is shown to read request information from link 306, pending read detector 404 may also monitor pending read requests from request queue 300. In one case, arbiter 100 modifies its behavior based on upstream information, or information from link 306. In the other case, arbiter 100 modifies its behavior based on downstream information, or information from request queue 300. It should be further noted that these described alternative implementations and many others should be apparent to an ordinarily skilled artisan in the field.

Figure 5:
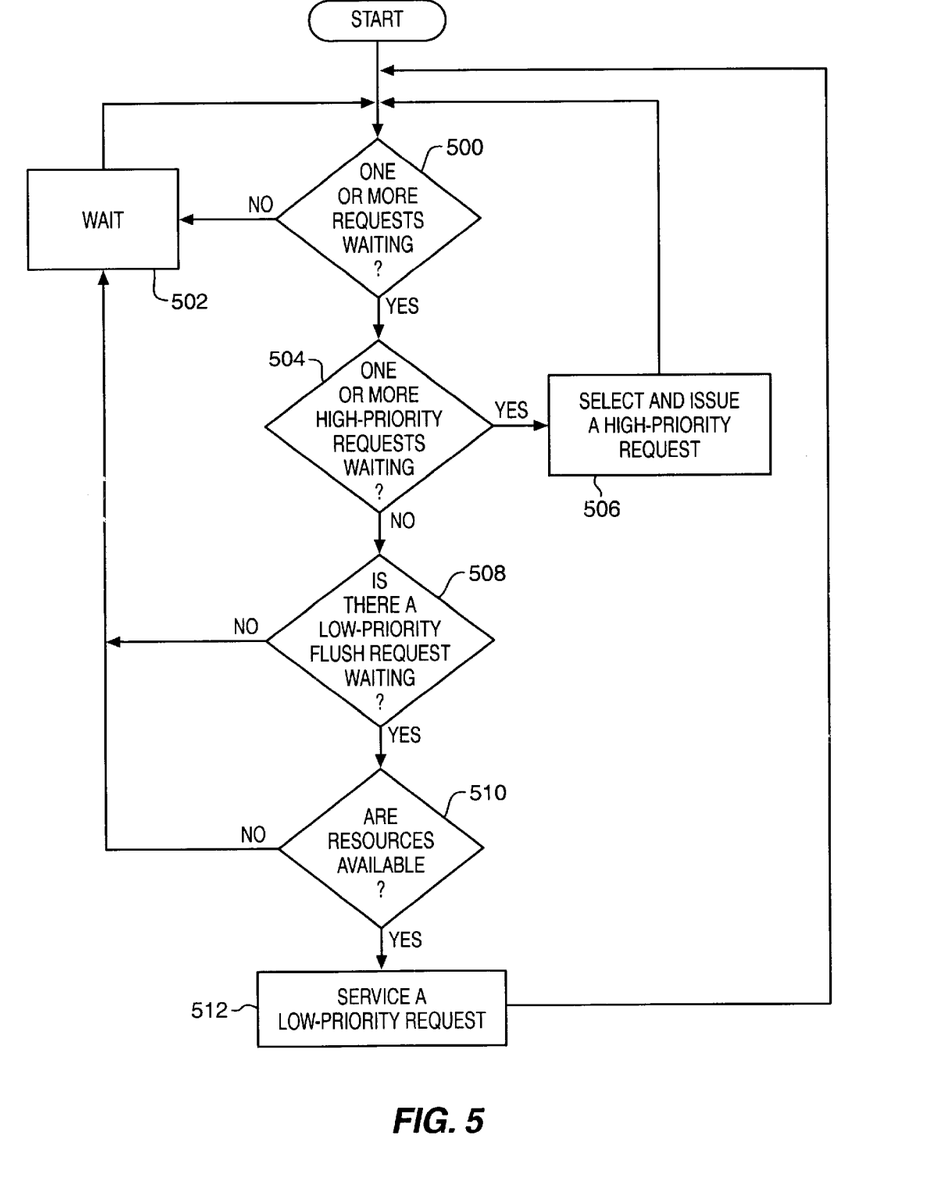
FIG. 5 illustrates a flow chart of one embodiment of a process performed by an arbiter to service a low priority flush request.

FIG. 5 illustrates a flow chart of one embodiment of a process performed by one embodiment of arbiter 100 to service a low-priority flush request. Arbiter 100 begins by verifying whether there exists one or more pending requests of any priority type in block 500. If the condition in block 500 returns false, arbiter 100 waits in block 502. Otherwise, arbiter 100 proceeds to determine whether there exists one or more high-priority requests in block 504. If the condition in block 504 returns true, in conjunction with FIG. 3, arbiter 100 selects and issues a high-priority request to request queue 300 in block 506. Otherwise, arbiter 100 proceeds to establish whether the pending requests are low-priority flush requests in block 508. If there exists a low-priority flush request, arbiter 100 proceeds to determine the availability of the resources according to any of the previously described mechanisms in block 510. When no low-priority flush request exists, arbiter 100 returns to block 502 and continues to wait for other incoming requests. Lastly, when block 510 indicates that resources are available, arbiter 100 services the low-priority flush request in block 512. In other words, arbiter 100 issues enabling signal 114 and places the low-priority flush request in request queue 300.

In one embodiment of arbiter 100 and in conjunction with FIGS. 3 and 4, the previously described resource busy detector 106 provides arbiter 100 with the information relating to block 510 through status signal 108. Moreover, pending highpriority-operation detector 104, or in a specific implementation, pending read detector 404 as shown in FIG. 4, supplies arbiter 100 with the information associated with block 504 through status signal 110.

Figure 6:
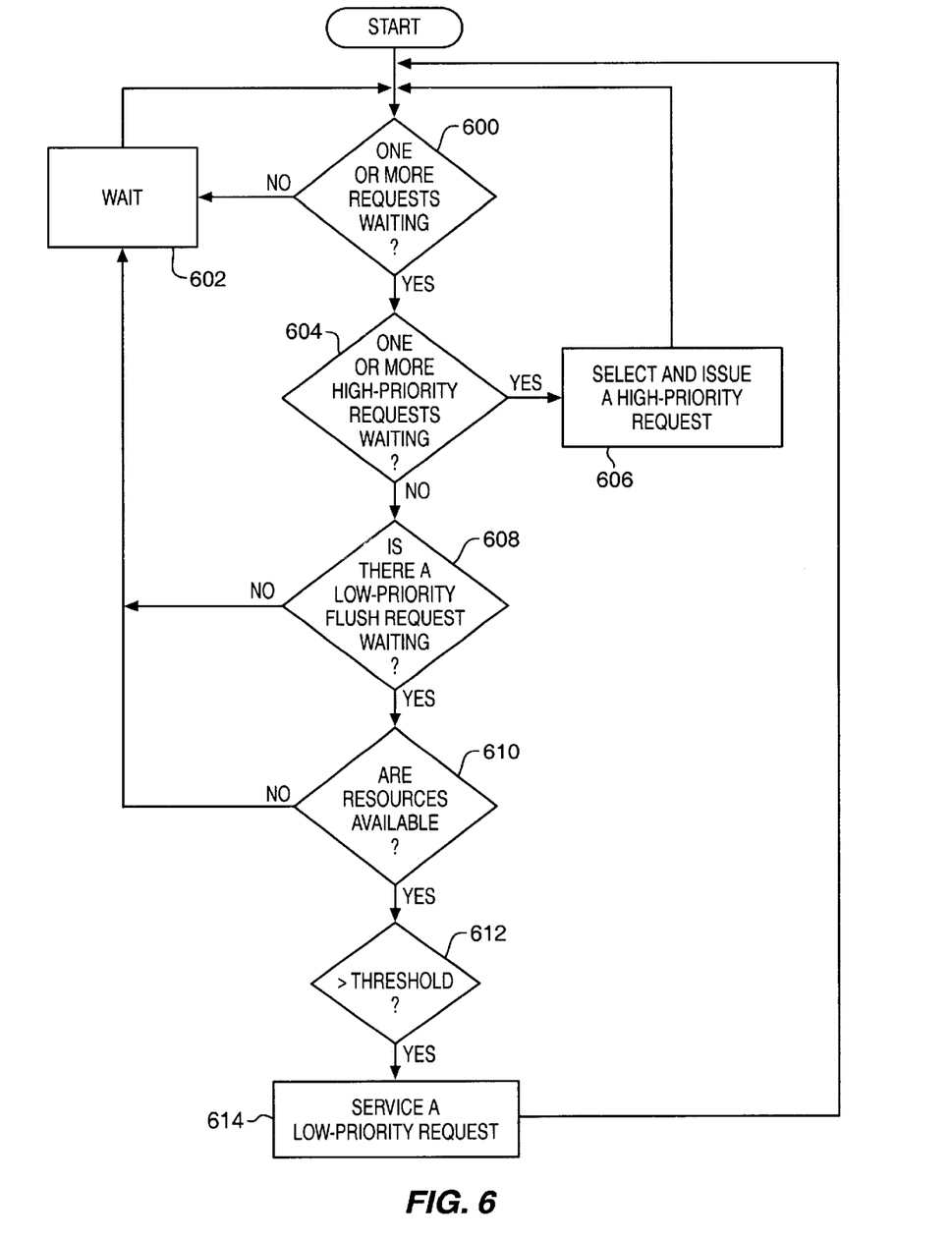
FIG. 6 illustrates a flow chart of one embodiment of another process performed by an arbiter to service a low priority flush request.

FIG. 6 is a similar flow chart as FIG. 5, except that arbiter 100 has one additional condition to meet before servicing the low priority flush request. Particularly, depth counter 400 shown in FIG. 4 maintains a number of occurrences for the low priority flush request. When the number exceeds a predetermined threshold in block 612, arbiter 100 can proceed to issue enabling signal 114. This predetermined threshold may be a fixed or a dynamic value.

It should be further noted that one embodiment of arbiter 100 following the flow charts shown in FIG. 5 and FIG. 6 may assume multithreading capabilities. In such an embodiment, an ordinarily skilled artisan shall employ any appropriate mechanism to safeguard against potential race conditions resulting from the asynchronous nature of a multithreaded system.

Thus, a method and apparatus of servicing an opportunistic operation request to a memory subsystem has been disclosed. Although the disclosure has particular references to the figures, the disclosure may appear in any number of systems, which provide a system controller capable of managing data flow between subsystems connected to the controller. It is further contemplated that many changes and modifications may be made by one of ordinary skill in the art without departing from the spirit and scope of the disclosure.

What is claimed is:

1. A method, comprising generating an enabling signal to service a request for a low priority write operation according to any combination of availability of resources of a memory subsystem, status of pending requests for a high priority operation, and status of the request for the low priority write operation, as determined by counting a number of occurrences of requests for the low priority write operation, where the signal is generated when:

a. resources of the memory subsystem are available;

b. the pending requests for the high priority operation have been serviced; and     c. the number of occurrences exceeds a threshold value.

2. The method according to claim 1, wherein the availability of resources is determined by collecting and using depth value information from downstream elements.

3. The electronic system according to claim 1, wherein the threshold value comprises a predetermined value.

4. An apparatus, comprising:

a. a resource busy to determine availability of resources of a memory subsystem and to generate a first status signal;

b. a pending high-priority-operation detector to monitor pending requests for a high priority operation and to generate a second status signal;

c. an opportunistic-operation monitor to monitor requests for an opportunistic operation and to generate a third status signal; and     d. an arbiter, coupled to the resource busy detector, the pending high-priority-operation detector and the opportunistic-operation monitor, to generate an enabling signal to service a given request for an opportunistic operation according to the first, the second and third status signals.

5. The apparatus according to claim 4, wherein the resource busy detector collects and uses depth value information from downstream elements to indicate the availability of resources in the first status signal.

6. The apparatus according to claim 4, wherein the opportunistic-operation monitor comprises a depth counter to count a number of occurrences of requests for the opportunistic operation request.

7. The apparatus according to claim 6, wherein the arbiter generates the enabling signal when:

a. the first status signal indicates that resources are available;

b. the second status signal indicates that no requests for high priority operations are pending; and c. the third status signal indicates that the number of occurrences exceeds a threshold value.

8. The apparatus according to claim 7, wherein the opportunistic operation refers to a low priority write operation.

9. The electronic system according to claim 7, wherein the threshold value comprises a predetermined value.

10. The apparatus according to claim 4, wherein the arbiter generates the enabling signal when:

a. the first status signal indicates resources are available; and b. the second status signal indicates no requests for the high priority operation are pending.

11. The apparatus according to claim 10, wherein the high priority operation refers to read operations.

12. An electronic system, comprising:

a system bus;

a microprocessor, coupled to the system bus; and a chipset component, coupled to the system bus and also coupled to a memory subsystem, wherein the chipset component further comprises:

a. a resource busy detector to determine availability of resources of the memory subsystem and to generate a first status signal;

b. a pending high-priority-operation detector to monitor pending request for a high priority operation and to generate a second status signal;

c. an opportunistic-operation monitor to monitor requests for an opportunistic operation and to generate a third status signal; and d. an arbiter, coupled to the resource busy detector, the pending high-priority-operation detector and the opportunistic-operation monitor, to generate an enabling signal to service a given request for an opportunistic operation according to the first, the second and third status signals.

13. The electronic system according to claim 12, wherein the resource busy detector collects and uses depth value information from downstream elements to indicate the availability of resources in the first status signal.

14. The electronic system according to claim 12, wherein the opportunistic-operation monitor comprises a depth counter to count a number of occurrences of requests for the opportunistic operation.

15. The electronic system according to claim 14, wherein the arbiter generates the enabling signal when:

a. the first status signal indicates that resources are available;

b. the second status signal indicates that no requests for the high priority operation are pending; and c. the third status signal indicates that the number of occurrences exceeds a threshold value.

16. The electronic system according to claim 15, wherein the opportunistic operation refers to a low priority write operation.

17. The electronic system according to claim 15, wherein the threshold value comprises a predetermined value.

18. The electronic system according to claim 12, wherein the arbiter generates the enabling signal when:

a. the first status signal indicates resources are available; and b. the second status signal indicates no requests for the high priority operation are pending.

19. The electronic system according to claim 18, wherein the high priority operation refers to read operations.

20. A machine-readable medium having stored thereon data representing sequences of instructions, the sequences of instructions which, when executed by a processor, cause the processor to generate an enabling signal to service a request for a low priority write operation according to any combination of availability of resources of a memory subsystem, status of pending requests for a high priority operation, and status of the request for the low priority write operation by counting a number of occurrences of requests for the low priority write operation, where the signal is generated when:

a. resources of the memory subsystem are available;

b. the pending requests for the high priority operation have been serviced; and c. the number of occurrences exceeds a threshold value.

21. The machine-readable medium according to claim 20, wherein the availability of resources is determined by collecting and using depth value information from downstream elements.

22. The machine-readable medium according to claim 20, wherein the threshold value comprises a predetermined value.

23. A method comprising:

a. determining if any pending requests exist;

b. if one or more pending requests exists, then determining if any of the one or more pending requests is a request for a high priority operation to a memory subsystem;

c. if any of the one or more pending requests is a request for the high priority operation, then selecting one of the pending requests for the high priority operation and issuing the selected pending request for the high priority operation to request queue;

d. if there are no pending requests for the high priority operation, then determining if there are any requests for an opportunistic operation; and e. if there are one or more pending requests for the opportunistic operation, then selecting one of the one or more pending requests for the opportunistic operation and issuing the selected pending request for the opportunistic operation to the request queue if resources of the memory subsystem are available.

24. The method according to claim 23, wherein the issuing the selected pending request for the opportunistic operation to the request queue occurs if, additionally, the number of occurrences of the pending requests for the opportunistic operation exceeds a threshold.

25. The method according to claim 23, wherein the issuing the selected pending request for the high priority operation and the issuing the selected pending request for the opportunistic operation comprise generating an enabling signal.

26. A method comprising:

a. receiving a request for a low priority write operation;

b. issuing the request to a request queue by generating an enabling signal when:

i. resources of the memory subsystem are available;

ii. the pending requests for the high priority operation have been serviced; and iii. a number of occurrences of the pending requests for the low priority write operation exceeds a threshold.

* * * * *